Feb. 11, 1936.   E. N. HEDEEN ET AL   2,030,588
CASKET CRYPT
Filed April 13, 1933    4 Sheets-Sheet 1

Inventor
E. N. Hedeen
and
H. B. Turner
By Bates, Goldrick & Teare
Attorneys

Feb. 11, 1936.　　　　E. N. HEDEEN ET AL　　　2,030,588

CASKET CRYPT

Filed April 13, 1933　　　4 Sheets-Sheet 2

Inventor

E. N. Hedeen
and
H. B. Turner

By Bates, Golrick & Teare
Attorneys

Feb. 11, 1936. E. N. HEDEEN ET AL 2,030,588
CASKET CRYPT
Filed April 13, 1933 4 Sheets-Sheet 3
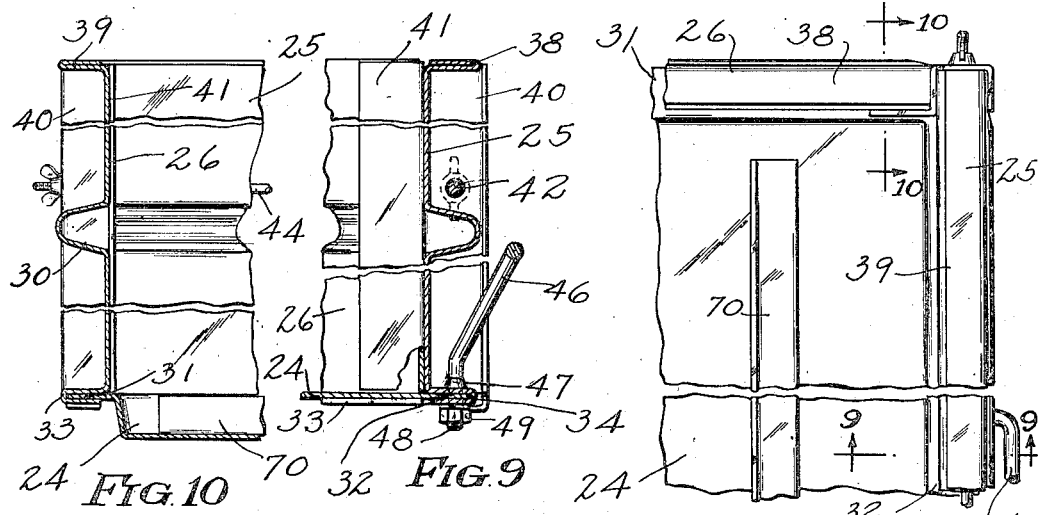
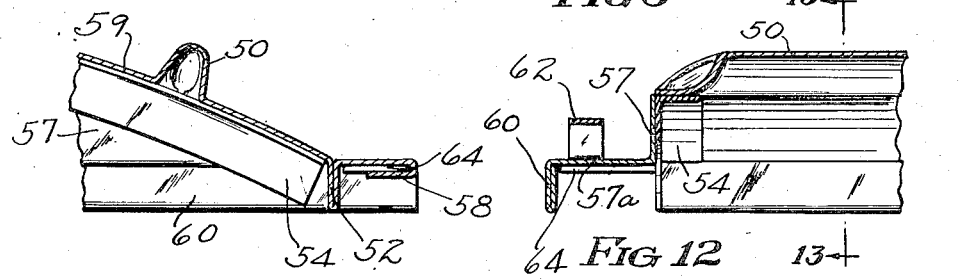
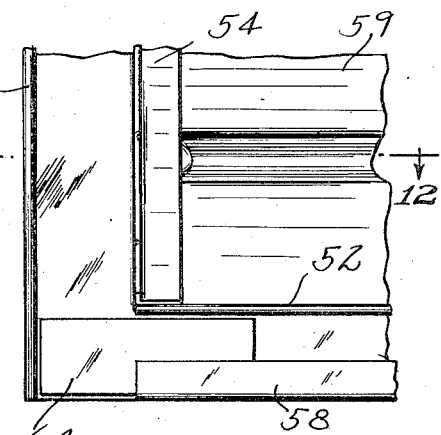
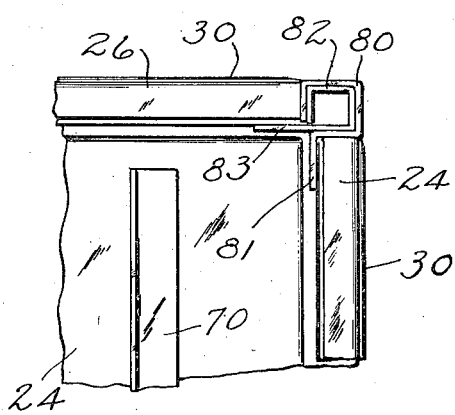

Feb. 11, 1936.  E. N. HEDEEN ET AL  2,030,588
CASKET CRYPT
Filed April 13, 1933  4 Sheets-Sheet 4
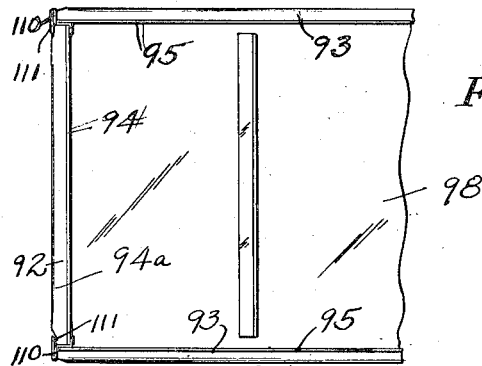
FIG.16
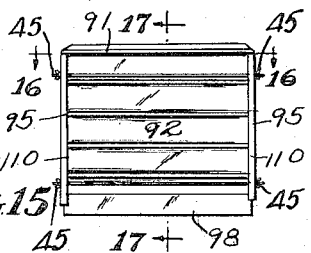
FIG.15
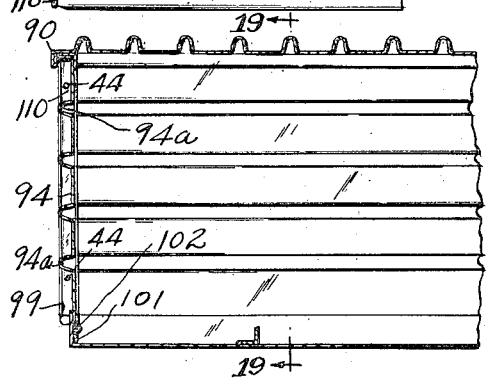
FIG.17
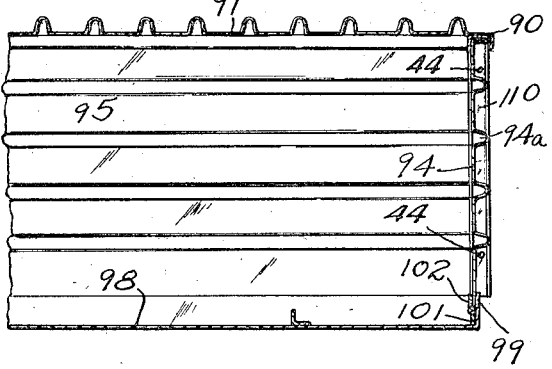
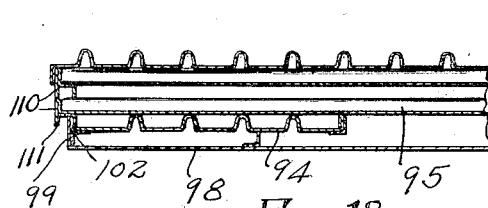
FIG.18
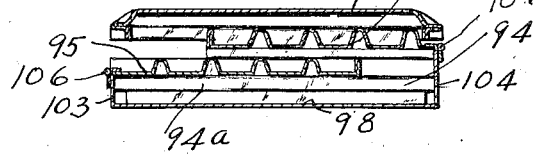
FIG.20
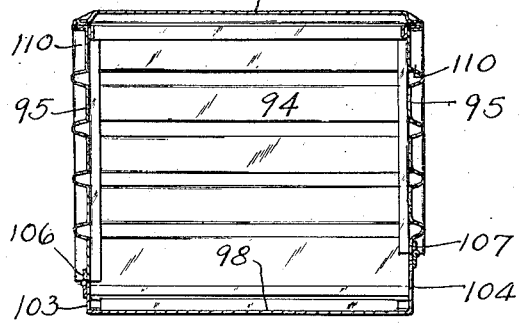
FIG.19
Inventor
E. N. Hedeen
and
H. B. Turner
By Bates, Goldrick & Teare
Attorneys Patented Feb. 11, 1936

2,030,588

UNITED STATES PATENT OFFICE 2,030,588

CASKET CRYPT

Elmer N. Hedeen and Howard B. Turner, Mansfield, Ohio

Application April 13, 1933, Serial No. 665,858

2 Claims. (Cl. 27—35)

This invention is directed to improvements in burial crypts and particularly to improvements in burial crypts manufactured from sheet metal.

It has been the practice heretofore to manufacture steel burial crypts or casket vaults by forming a base of sheet metal, usually provided with some form of attaching or inter-engaging means for locking the base to the cover. The cover comprised side walls, end walls and a top integrally formed, the arrangement being such that at the time of use the casket would be placed upon the base and then the vault would be placed over the casket to engage the base, the base being of greater width and length than the casket. Such vault construction involved either welding, brazing or riveting methods in assembling the body and resulted in a very bulky article of manufacture, requiring considerable shipping space and consequently high shipping costs.

Wherefore, the general object of the present invention is to provide a burial vault or a casket crypt, constructed of very light sheet metal in such manner as to have the desired capacity when assembled and which will be attractive in appearance, and more important, a construction which will permit of the shipping of the vault in a knocked down condition in a compact package.

A further object of our invention is the provision of a metallic burial vault construction, which is so economical in manufacture that it can be utilized by the casket manufacturer as a shipping container for caskets.

A still further object of our invention is the provision of a metallic vault construction which can be compactly shipped and thereafter readily assembled, and which may be of a very light weight.

Other objects of our invention will become apparent from the description hereinafter set forth, which refers to the accompanying drawings, the drawings illustrating several embodiments of our invention. The essential characteristics thereof are summarized in the claims.

Figure 1:
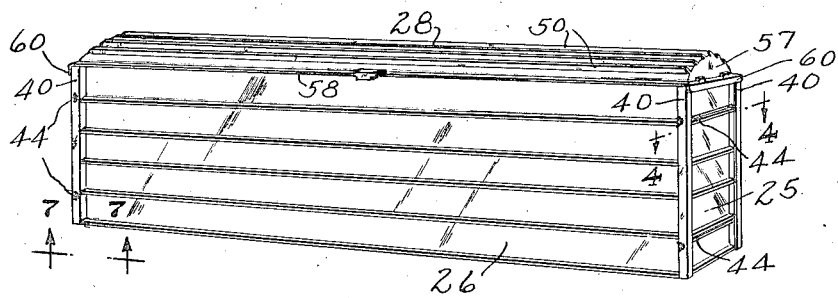
Figure 2:
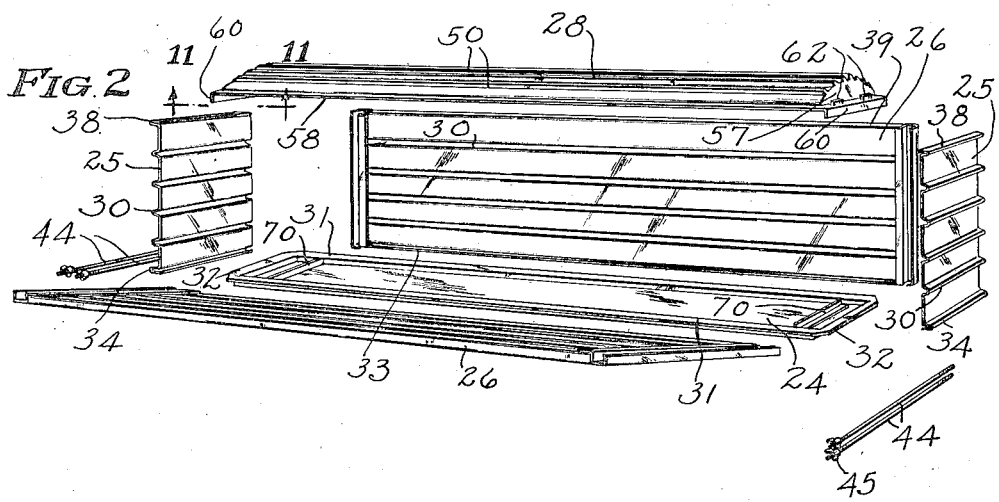
Figure 3:
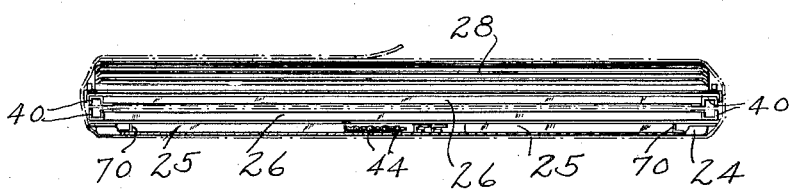
Figure 4:
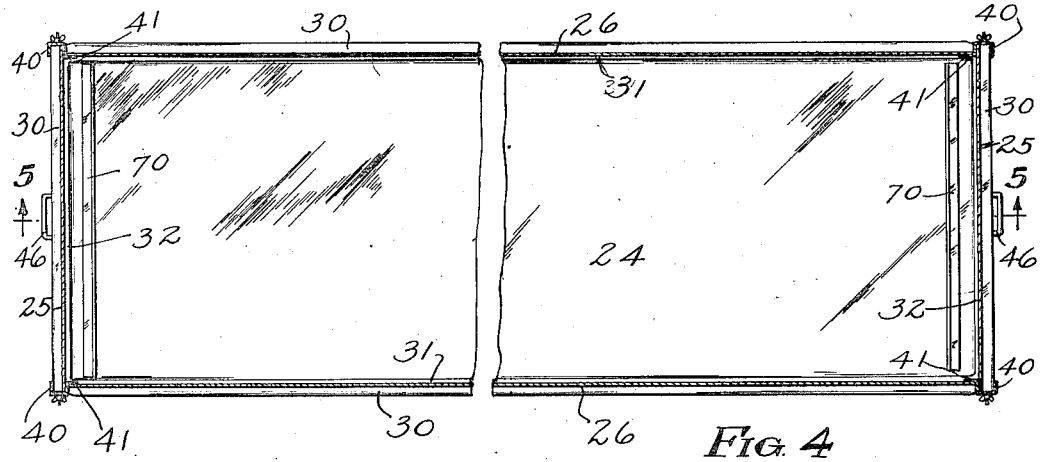
Figure 5:
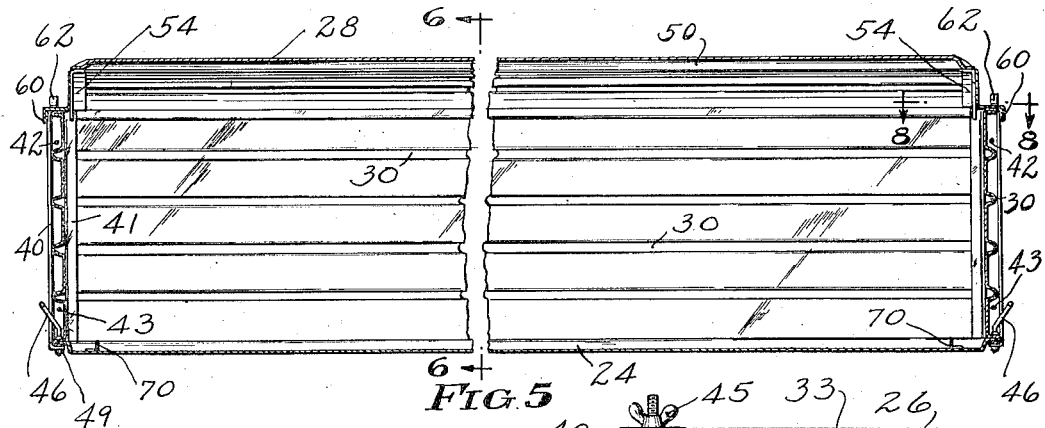
Figures 6, 7:
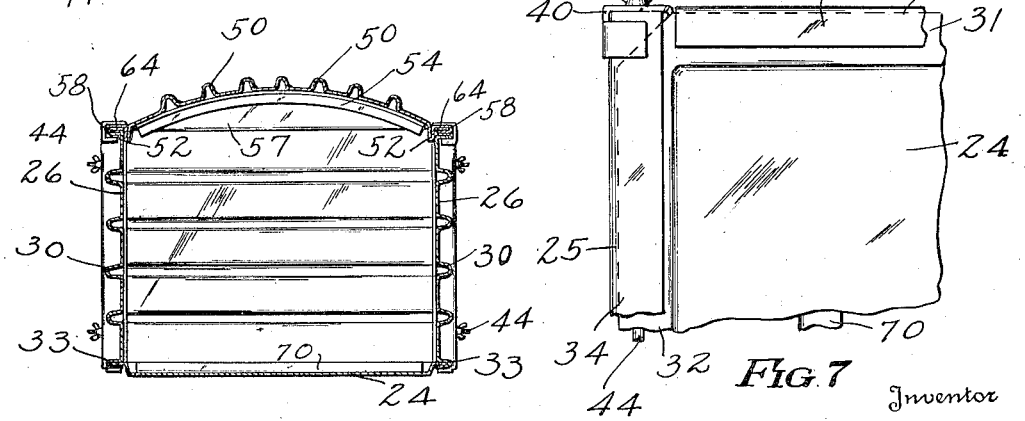

In the drawings, Fig. 1 illustrates in perspective a metallic burial vault or crypt embodying the features of our invention; Fig. 2 is a perspective view, illustrating the various members comprising the vault construction in separated relation; Fig. 3 is a cross-section taken through our novel package with the vault members conditioned for shipment; Fig. 4 is a cross-sectional plan view, taken along a plane in Fig. 1, indicated by the line 4—4 of Fig. 1; Fig. 5 is a cross-sectional elevation, taken longitudinally of the vault construction, substantially along a plane indicated by the line 5—5 of Fig. 4; Fig. 6 is a transverse cross-sectional elevation, taken through the vault construction, substantially along the line 6—6 of Fig. 5; Fig. 7 is a fragmentary plan view, looking upwardly at one corner of the bottom of the vault construction, as indicated by the line 7—7 of Fig. 1; Fig. 8 is a fragmentary plan view, of one corner of the vault construction, as viewed from the top with the cover removed, and as indicated by the line 8—8 of Fig. 5; Fig. 9 is a cross-sectional detail, taken substantially along the line 9—9 of Fig. 8, and illustrating a manner of attaching a handle to the base of the vault structure; Fig. 10 is a fragmentary cross-sectional view, taken substantially along the line 10—10 of Fig. 8; Fig. 11 is a view of one corner of the cover or lid construction when looking at the inside of the cover; Fig. 12 is a cross-sectional detail, taken substantially along the line 12—12 of Fig. 11; Fig. 13 is a fragmentary transverse cross-sectional view of the cover construction taken substantially along the line 13—13 of Fig. 12.

In Fig. 14 I show a fragmentary view of a modified form of corner construction for the crypt when viewed from the top of the structure. In Fig. 15 I show a third form of construction, wherein the end panels, the side panels and the bottom structure of the crypt are connected in hinged relation. Fig. 16 is a plan view of substantially one-half of the crypt construction, shown in Fig. 15, with the lid or cover removed. Fig. 17 is a longitudinal cross-sectional elevation of the crypt construction, shown in Fig. 15, taken along the line 17—17 of such Fig. 15. Fig. 18 illustrates the packing assembly relationship of the members comprising the crypt construction shown in Fig. 15. Fig. 19 is a transverse cross-sectional view, taken substantially along the line 19—19 of Fig. 17, while Fig. 20 is a transverse cross-sectional view of the packing assembly shown in Fig. 18.

Our invention contemplates the provision of a steel burial vault or crypt construction, having a double utility, namely, use as a burial vault and adapted to receive a casket and as a shipping case for the manufacturer of the casket, thus eliminating the necessity of the use of a wooden shipping case, or so-called "rough box", and we construct the vault members in such manner that while being lighter in weight as compared to the usual steel burial vault, nevertheless will be of adequate strength to serve as a shipping case for the casket and later as a metal burial vault, and the sheet metal parts are designed and assembled in such manner as to permit of convenient surface decoration.

In Figs. 1 and 2 of the drawings, we show the members of the structure as comprising corrugated end panels 25, corrugated longitudinal or side panels 26, a bottom panel 24 and a top or cover structure 28, and, as shown, all of these members, with the exception of the bottom panel member 24, are provided with ribs 30 in the form of outwardly extending corrugations, formed in the bodies of the sheets of metal comprising the respective members. The bottom panel 24 is depressed throughout the major area thereof, whereby a marginal flange is provided completely around the edges thereof, hereinafter referred to as side flanges 31, and end flanges 32. Flanges 31, while adding strength to the bottom panel, afford a slip engagement with slots formed in the side panels 26, along the lower marginal edges thereof, these slot formations being afforded by the rib and flange formations 33 at the lower edges of the side panels 26. The end panels 25 are likewise provided with bottom rib formations 34, which serve to engage the end flanges 32 on the bottom panel 24. The end panels 25 and the side panels 26 are provided with top reinforcing flanges, respectively, which may correspond substantially to the height of the reinforcing corrugations or ribs 30.

We will now describe the corner construction for firmly joining the end and side panels in assembled relation. As shown in Fig. 4, bearing plates, adapted to abut the edges of the end panels 25, are secured in any suitable manner, as by welding, to the ends of the side panels 26 and these bearing plates may comprise U-shaped channel members 40, provided with inwardly extending flanges 41, which are secured to the ends of the side panels 26. The internal width of the channel 40 corresponds to the overall height of the ribs 30, formed on the end members. The members 40 are provided with perforations 42 and 43, for the purpose of receiving clamping rods 44, the ends of the clamping rods being threaded and provided with wing nuts 45, whereby the structure may be manually firmly clamped together when assembled.

If desired, handles may be provided for lifting the crypt in a convenient manner and we prefer to attach the handles to the bottom rib formations 34 of the end panel members, and as shown in Fig. 9, these handles may be U-shaped members 46, provided with enlargements 47, and lower threaded ends 48 for engagement with nuts 49. The threaded portions 48 extend through openings formed in the rib structures 34 of the end panels 25, and through aligning openings formed in the flanges 32 of the bottom panel. When the handles are attached, they also serve as a clamping means for effecting firm and permanent engagement between the bottom flange structures 34 of the end panels 25 and the bottom panel of the structure.

The cover construction may be flat, if desired, but for the purpose of obtaining the maximum strength with minimum weight of metal, we prefer to form the main sheet metal member 59 of the cover in the crown shape shown in Figs. 1, 2 and 6 of the drawings, and to preserve the continuity of appearance of all of the exposed surfaces of the vault, as well as to add further strength to the cover, we form corrugations or ribs 50 in the crown portion thereof, as shown in detail in Figs. 12 and 13. As shown in the drawings, the cover or lid may comprise substantially one integral sheet of material, equal in length to the inner longitudinal dimension of the vault, and along the sides of the margin thereof is provided a downwardly extending rebent flange formation 52 (see Fig. 13). The transverse distance between the flange formation 52 is substantially equal to the inside width of the vault structure, whereby the flanges extend into the interior of the vault when the cover or lid is placed thereover, thus serving to strengthen the cover construction, as well as to guide the cover when being placed upon the vault structure. The ends of the metal member 59 are secured to arcuately form angle irons 54, which angle irons are secured to end closure members 57. The end closure members 57 are flanged outwardly (portions 57a) in the plane of outwardly extending flanges 58 formed on the sheet metal member 59 and are provided with downwardly extending flanges 60, which extend downwardly over the top flanges 38 of the end members or panels 25 when the cover is placed upon the vault. If desired, pairs of handles 62 may be attached to the horizontal flanges of the end members 57 to facilitate convenience in handling the cover. We prefer to provide connecting strips 64 of suitable length to serve as a hidden connecting medium between the horizontally disposed flange portion 57a of the end member 57 and the side horizontal flanges 58 of the main sheet metal member 49, as shown in Figs. 11 and 13.

It is to be understood that the respective members, comprising the cover structure, may be secured together by riveting, but we prefer welding operations in order to obtain a neat appearance of the structure and not detract from any decoration which may be applied to the exposed surfaces of the vault structure.

To further strengthen the bottom panels 24, and to also serve as a casket rest, we provide angle members 70 adjacent the end of the bottom panel member 24, which may be spaced a substantial distance from the end of the bottom panel.

The advantage in shipping the foregoing described structure, will be apparent from a consideration of the package illustrated in Fig. 3 of cross-section, and in which figure the various parts of the structure carry the respective reference numerals to the parts, hereinbefore used. When the parts are being assembled, as shown in Fig. 3, for the purpose of forming the packing, the end panel members are laid within the depressed portion of the bottom panel member 24. The clamping rods 44 are placed between the end panel members and the handles 46 are likewise so positioned. It is to be understood, of course, that packing insulation is inserted between the respective members when being thus assembled for packing. The two side panels 26 are then arranged inner face to inner face, with shipping insulation therebetween, and then laid over the bottom panel member, as shown, with shipping insulation inserted between the bottom panel and the lower side panel, and the end panels and said lower side panels. A layer of shipping insulation is then placed over the uppermost side panel and the lid or cover is then placed as shown. The entire shipping assembly is then wrapped in staunch shipping or carton board, and the entire package may then be bound together with any suitable binding means, such as metallic strips, binding wire, etc.

In Fig. 14 we show a modified form of corner construction for connecting the side and end panel members together. In this construction a flanged tubular member 80 has the flange 81 thereof secured to the inner surface of the end panel member 24. A similar tubular member 82 is of such dimension as to telescope into the tubular member 80 and is provided with an internally disposed flange 83 to afford securement to the side panel member 26. In this construction the side panel member 26 has the lower longitudinal marginal edge thereof formed to connect with the bottom panel, in the manner hereinbefore described, with reference to the construction shown in Fig. 1, but the end panel members 24 are provided with flanges affording no groove for engagement with the flanges 32 of the bottom panel member, but would be merely clamped to the bottom panel 32 by the handles 46.

In Figs. 15 to 20 I show a still further form of collapsible construction for a burial crypt, wherein the top and sides are corrugated for the purposes hereinbefore described. However, the corrugations on the top or lid extend transversely of the structure and no crowning feature is incorporated therein. Flanges 90 extend completely around the marginal edges of the lid panel 91 to engage top flanges 92 and 93 respectively formed on the end panels 94 and side panels 95. In this structure, the bottom panel 98 is provided with vertically extending end flanges 99 inside of which the lower parts of the end panels 94 abut, and we provide hinges 102 for attaching the end panels 94 permanently to the bottom panel 98. The height of the hinge joint is such that the end panels can be swung inwardly to the position shown in Fig. 18. One of the side panels 95 is attached to a side flange 103 extending vertically, as shown in Fig. 19, from the bottom panel 98, and the other side panel 95 is hinged to a flange 104 of a greater height than the flange 103, whereby the hinges 106 and 107 may be disposed at different heights to afford the folding packing assembly illustrated in Figs. 18 to 20.

In this construction, the end panels are not provided with the corner joining means, such means being welded to the ends of the side panels. This means comprises a vertically extending strip 110, (see Fig. 16) formed to embrace inner and outer surfaces of the edges of the end panels 92, and these strip formations afford a flange 111, which strengthens the corner structure and closes the ends of the corrugations or ribs formed in the side panels 95. In this construction, the member 110 affords a channel or groove, the width of which is substantially equal to the overall height of the ribs 94a formed on the end panels 94 and are provided with perforations near the top and bottom thereof for the reception of the clamping bolts, as shown in Fig. 15.

When it is desired to ship the structure just described, the end members are folded inwardly in the manner shown in Fig. 18, and thereafter the side panels are folded inwardly, one over the other, packing insulation being utilized in the manner hereinbefore referred to in connection with the description of the package shown in Fig. 3, and the cover or lid is then placed on top of the assembly.

From the foregoing description of the several embodiments of our invention, it will be apparent that we provide a burial crypt or vault which may be formed of relatively thin sheet metal as compared to the gauges of metal heretofore used in the manufacture of steel vaults. The apparatus can be very readily packed in a compact manner, thus effecting great saving in shipping cost, and the nature of the construction is such that the entire construction can be very economically manufactured at such low cost that the vault can be utilized by the casket manufacturer in lieu of the so-called "rough box" when shipping the casket to the mortician and the mortician may thereafter use the crypt as a burial vault.

We claim:

1. A casket crypt comprising a construction of pairs of end and side walls, and a bottom wall forming an oblong casket container, the side and end walls being provided with outwardly extending corrugations and one of said pairs of walls being provided with plain surface formations affording compression bearing surfaces for the corrugated ends of the other pair of walls, said pairs of walls having the bottom edges thereof formed to interengage with the marginal edges of the bottom wall and clamping means for causing said pairs of walls to compressively engage each other and said bottom wall.

2. A collapsible casket crypt comprising a construction of pairs of end and side walls, and a bottom wall forming an oblong casket container, the side and end walls being provided with outwardly extending corrugations and one of said pairs of walls being provided with plain surface formations affording compression bearing surfaces for the corrugated ends of the other pair of walls, said pairs of walls having the bottom edges thereof formed to interengage with the marginal edges of the bottom wall, clamping means for causing said pairs of walls to compressively engage each other and said bottom wall and handles attached to the structure at the bottom thereof, each handle interconnecting one of said walls with the bottom whereby the handles also serve as a clamping means for securing at least a pair of said walls to the bottom wall.

ELMER N. HEDEEN.
HOWARD B. TURNER.